United States Patent Office 3,158,580
Patented Nov. 24, 1964

3,158,580
POLY(EPIHALOHYDRIN)S
Edwin J. Vandenberg, Wilmington, Del., assignor to Hercules Powder Company, Wilmington, Del., a corporation of Delaware
No Drawing. Filed Mar. 11, 1960, Ser. No. 14,201
12 Claims. (Cl. 260—2)

This invention relates to new high molecular weight, amorphous, poly(epihalohydrin)s which are elastomeric and capable of being vulcanized to unique, special purpose rubbers.

It is well known that epichlorohydrin may be polymerized to low molecular weight polymers varying from low viscosity liquids to very viscous liquids. These prior art polymers are soluble in a wide variety of organic solvents such as methanol, ethanol, ether, etc. It is also known that epichlorohydrin may be polymerized to a high molecular weight crystalline polymer.

Now in accordance with this invention it has been found that epihalohydrins may be polymerized to solid, high molecular weight, amorphous polymers that, unlike the prior art liquid or crystalline polymers, are elastomeric and are entirely different in their physical properties, solubility in organic solvents, and utility. These new, amorphous, high molecular weight poly(epihalohydrin)s are unique in that they are saturated polymers which may be vulcanized to produce rubbers which have the properties of high tensile strength coupled with high solvent resistance. Hence, they are particularly useful as speciality rubbers in a wide field of applications.

As pointed out above, the poly(epihalohydrin)s of this invention are solid high molecular weight, amorphous polymers with elastomeric properties. For these polymers to exhibit such elastomeric properties, it has been found that they must have a reduced specific viscosity of at least about 0.2 and preferably about 0.5 as measured on a 0.1% solution of the polymer in α-chloronaphthalene at 100° C. In the case of poly(epichlorohydrin) this represents a weight average molecular weight of at least about 40,000 and more preferably above about 100,000. At an RSV substantially below about 0.2 these polymers lose their elastomeric properties and are incapable of being handled on conventional rubber equipment, and while they can be cross-linked, the product is either not a useful rubber or not at rubber at all. In the same way, liquid polymers of epihalohydrins are not elastomeric and are not amenable to vulcanization by conventional rubber technology. Crystalline polymers of epihalohydrins are capable of being cross-linked, but the vulcanizate has no elastomeric properties and so is not useful as a rubber. On the other hand, the amorphous poly(epihalohydrin)s of this invention having an RSV of at least about 0.2 can be vulcanized to produce useful rubbers. For optimum physical properties, ease of handling on commercial rubber equipment and ease of fabrication, the poly(epihalohydrin)s of this invention will have an RSV of at least about 0.5.

Poly(epihalohydrin)s which are essentially wholly amorphous are desirable for use in applications where the best elastomeric properties, i.e. highest elongation with the most rapid recovery, are desired. However, for some applications where less elasticity is desired or needed, the amorphous poly(epihalohydrin)s may be used in admixture with a crystalline poly(epihalohydrin). To retain the elastomeric characteristic, such a mixture should be predominately amorphous and preferably will contain less than about 25–30% of the crystalline polymer and more preferably less than about 15–20% of the crystalline polymer. In the case of poly(epichlorohydrin) the products having best elastomeric properties have densities of about 1.38 (g./ml. at 23° C.) or less and preferably in the range of from about 1.35 to about 1.38. These amorphous poly(epihalohydrin)s are also useful to modify the properties of the crystalline poly(epihalohydrin)s which are stiff plastics. Thus, mixtures or blends of amorphous and crystalline polymers, wherein the crystalline polymer predominates, are more flexible than the crystalline polymer and have properties intermediate between those of a rubber and those of a plastic. Such mixtures are quite advantageous in many uses. The amorphous poly(epihalohydrin)s are also compatible with other halogen-containing polymers and with other specialty elastomers.

The amorphous poly(epihalohydrin)s of this invention may be vulcanized to produce rubbers which, particularly in the case of poly(epichlorohydrin), have excellent swelling resistance to solvents such as the hydrocarbons and chlorinated hydrocarbons. These rubbers also have excellent building tack and give low heat build-up on flexing. They are outstanding in aging resistance. This includes ordinary outdoor exposure, ozone exposure, and heat aging in air up to temperatures of at least 250° F. Another outstanding property of these rubbers is their low flex cut growth. Thus, it may be seen that they have outstanding elastomeric properties and, thus, unusual utility in the specialty rubber field.

These amorphous poly(epihalohydrin)s are readily vulcanized by means of a polyamine as the cross-linking agent. Any amine containing two or more amino groups may be used as, for example, ethylenediamine, tetramethylenediamine, hexamethylenediamine, piperazine, etc. Particularly useful are the salts of these amines, such as hexamethylenediamine carbamate. The amine may be simply blended with the polymer and the mixture then cured at elevated temperature as, for example, at a temperature of 250° F. to 340° F. for about 20 to 40 minutes. Another method of vulcanizing these amorphous poly(epihalohydrin)s is to heat a mixture of the polymer, an amine and sulfur compound, such as sulfur, a dithiocarbamate, a dialkyl thiuram disulfide, a tetraalkyl thiuram mono- or disulfide, or a thiazole. Again, the cross-linking agents may be simply blended with the polymer and the curing effected by heating to a temperature of from about 250° F. to about 340° F. for about 20 to 40 minutes. In addition to the cross-linking agents, other ingredients may be incorporated as, for example, extenders, fillers (carbon black, silica, etc.), pigments, plasticizers, and other additives commonly used in rubber vulcanization.

The poly(epihalohydrin)s of this invention may be prepared by polymerizing any epihalohydrin, e.g. epichlorohydrin, epibromohydrin, epiiodohydrin, or epifluorohydrin or any mixture of these epihalohydrins, using as the catalyst for the polymerization an organoaluminum compound. When epihalohydrins are polymerized by this process, polymerization takes place, essentially wholly through the epoxide linkage, so that the product is an essentially linear polyether containing halomethyl groups attached to the main polymer chain. They are believed to have the following general formula:

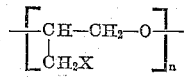

where X is halogen. The amorphous poly(epihalohydrin)s of this invention are further characterized by an essentially random stereoconfiguration of the halomethyl-bearing carbon atoms.

The polymerization of the epihalohydrins is readily carried out by contacting the epihalohydrin or mixture of epihalohydrins with the organoaluminum catalyst. Particularly effective organoaluminum compounds to be used as catalysts are organoaluminum compounds which have been reacted with a small amount of water, chelated organoaluminum compounds, and chelated organoaluminum compounds that have been reacted with a small amount of water. Exemplary of the organoaluminum compounds that may be reacted with water and used are trialkylaluminum compounds, tricycloalkylaluminum compounds triarylaluminum compounds, dialkylaluminum hydrides, monoalkylaluminum dihydrides, dialkylaluminum halides, monoalkylaluminum dihalides, dialkylaluminum alkoxides, monoalkylaluminum dialkoxides, and complexes of these compounds as, for example, the alkali metal aluminum tetraalkyls such as lithium aluminum tetraalkyl, etc. Thus, these compounds may be defined as any aluminum compounds containing an aluminum to carbon bond or having the formula $AlRX_2$ where R is any alkyl, cycloalkyl, aryl, or alkaryl radical and X may be alkyl, such as methyl, ethyl, propyl, isopropyl, n-butyl, isobutyl, amyl, hexyl, octyl, decyl, etc., aryl, such as phenyl, tolyl, halophenyl, etc., cycloalkyl, such as cyclohexyl, etc., hydrogen, halogen such as chlorine, fluorine, or bromine, alkoxy such as methoxy, ethoxy, isopropoxy, butoxy, isobutoxy, tert-butoxy, etc., and the radical

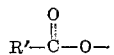

such as acetoxy, stearoxy, benzoxy, etc. Another group of these compounds are those formed by reacting an aluminum alkyl with a polyol such as ethylene glycol, propylene glycol, glycerin, pentaerythritol, sorbitol, catechol, resorcinol, etc., in which case the X in the above formula would be $-O-R''-O-AlRX$, where $R''$ is alkylene, phenylene, etc. In some cases it may be desirable to complex the organoaluminum compound with a complexing agent such as diethyl ether, tetrahydrofuran, etc., as for example, triisobutylaluminum complexed with a molar amount of tetrahydrofuran, etc.

Exemplary of the chelated organoaluminum compounds that may be used as the catalyst are the trihydrocarbonaluminum chelates and the dihydrocarbonaluminum hydride chelates such as those formed by reacting a trialkylaluminum or dialkylaluminum hydrate such as triethylaluminum, triisobutylaluminum, diisobutylaluminum hydride, etc., with an organic compound that is capable of forming a ring by coordination with its unshared electrons and the aluminum atom. Preferably these chelating agents are characterized by two functional groups, one of which is an —OH group or —SH group, as for example, a hydroxyl, or an enol of a ketone, sulfoxide or sulfone, an OH of a carboxyl group, etc., which —OH or —SH group interacts with the trialkylaluminum or dialkylaluminum hydride to form a conventional, covalent aluminum-oxygen bond or aluminum-sulfur bond. The second functional group is one which contains an oxygen, nitrogen, or sulfur atom that forms a coordinate bond with the aluminum. Examples of groups containing such oxygen, nitrogen or sulfur atoms are:

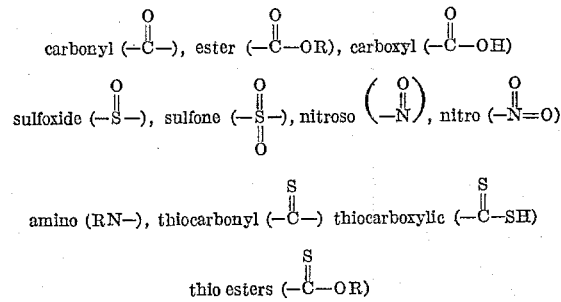

etc., groups. The ring size formed with the aluminum by the chelating agent preferably contains five or six atoms including the aluminum, but rings with four and seven atoms are also operable. The amount of chelating agent reacted with the alkylaluminum compound will generally be within the range of from about 0.1 to about 2 moles of chelating agent per mole of aluminum and preferably will be from about 0.3 to about 1 mole per mole of aluminum alkyl. Exemplary of the chelating agents that may be reacted with a trialkylaluminum or dialkylaluminum hydride and the chelate then reacted with water to produce the catalysts of this invention are diketones, such as acetylacetone, trifluoroacetylacetone, acetonylacetone, benzoylacetone, furoylacetone, thenoyltrifluoroacetone, dibenzoyl methane, 3-methyl-2,4-pentane-dione, 3-benzyl-2,4-pentane-dione, etc., ketoacids, such as acetoacetic acid, ketoesters such as ethyl acetoacetate, ketoaldehydes such as formylacetone, hydroxyketones such as hydroxyethyl methyl ketone, hydroxyacetone, o-hydroxyacetophenone, 2,5-dihydroxy-p-benzoquinone, etc., hydroxyaldehydes such as salicylaldehyde, hydroxy esters such as ethyl glycolate, 2-hydroxyethyl acetate, dicarboxylic acids and their esters such as oxalic acid, malonic acid, etc., monoesters of oxalic acid, mono- and diesters of malonic acid, etc., dialdehydes such as malonaldehyde, alkoxyacids such as ethoxyacetic acid, ketoximes such as 2,3-butane-dione-monoxime, dialdehyde monooximes such as glyoxal monoxime, hydroxamic acids such as N-phenyl benzohydroxamic acid, dioximes such as dimethyl glyoxime, nitro compounds such as 1,3-nitroalcohols, 1,3-nitroketones, 2-nitroacetic acid, nitroso compounds such as 1,2-nitroso-oximes, etc. Chelating agents with two or more chelating functions may also be used, as for example, 2,5-dihydroxy-p-benzoquinone, bis(1,3-diketones) such as $$(CH_3CO)_2CHCH(COCH_3)_2$$

$(CH_3CO)_2CH(CH_2)_nCH(COCH_3)_2$ where $n$ is 2, 6 or 10, bis(1,2-ketoximes), bis(1,2-dioximes), etc. In most cases the effects of these chelated aluminum compounds are further enhanced by reacting the aluminum chelate with water. When the aluminum chelate is reacted with water, the ratio of chelating agent to aluminum hydrocarbon compound is then preferably within the range of from about 0.01 to about 1.5 moles per mole of aluminum.

In reacting the organoaluminum compound with water as set forth above, there is used a molar ratio of from about 0.1 mole of water per mole of organoaluminum compound up to about 1.5 moles of water per mole of aluminum compound. Slightly higher amounts of water may be used but at a ratio of about 2 moles of water to 1 mole of organoaluminum compound, there is little or no improvement over the use of no water in the polymerization system and when the ratio of water to organoaluminum compound gets appreciably above 2:1, it has an adverse effect, and the polymerization is retarded or otherwise adversely affected. Preferably the molar ratio of water to organoaluminum compound will be in the range of from about 0.2:1 to about 1:1. The exact amount of water will depend to some extent on the organoaluminum compound, the epoxide being polymerized, the diluent, temperature, etc.

Any desired procedure may be used for reacting the organoaluminum compound with the specified molar ratio of water. Generally better results are obtained if the organoaluminum compound and water are prereacted and the reaction product then added to the polymerization mixture. This may readily be done, and preferably is done, by adding the specified amount of water gradually to a solution of the organoaluminum compound in an inert diluent, as for example, a hydrocarbon diluent such as n-hexane, toluene, or an ether such as diethyl ether, tetrahydrofuran, etc., or a mixture of such diluents. It may also be done in the absence of a diluent. If a chelating agent is used, it may be added before or after reacting with water. The chelating agent and prereacted organoaluminum–water product may also be reacted in situ. These organoaluminum–water reaction products may be used immediately or aged or, if desired, heat-treated in some cases. Excellent results may also be obtained by reacting the organoaluminum compound with the water within the specified molar ratio in situ. This may be accomplished by adding the specified amount of water to the epoxide or mixture of epoxides being polymerized and then adding the organoaluminum compound, or the two may be added to the polymerization reaction mixture simultaneously. If desired, the organoaluminum–water reaction product may be used in combination with other organoaluminum compounds.

Any amount of the organoaluminum chelate or organoaluminum–water reaction product may be used to catalyze the polymerization process from a minor catalytic amount up to a large excess but, in general, will be within the range of from about 0.2 to 10 mole percent based on the monomer being polymerized and preferably will be within the range of from about 1 to 5 mole percent based on the monomer being polymerized. The amount used depends in part on such factors as monomer purity, diluent purity, etc., less pure epoxides and diluents requiring more catalyst to destroy reactive impurities. In order to decrease catalyst consumption, it is generally preferred that impurities such as carbon dioxide, oxygen, aldehydes, alcohols, etc., be kept at as low a level as practical.

The polymerization reaction may be carried out by any desired means, either as a batch or continuous process with the catalyst added all at one time or in increments during the polymerization or continuously throughout the polymerization. If desired, the monomer may be added gradually to the polymerization system. It may be carried out as a bulk polymerization process, in some cases at the boiling point of the monomer (reduced to a convenient level by adjusting the pressure) so as to remove the heat of reaction. However, for ease of operation, it is more generally carried out in the presence of an inert diluent. Any diluent that is inert under the polymerization reaction conditions may be used as, for example, ethers such as the dialkyl, aryl or cycloalkyl ethers as, for example, diethyl ether, dipropyl ether, diisopropyl ether, aromatic hydrocarbons such as benzene, toluene, etc., or saturated aliphatic hydrocarbons and cycloaliphatic hydrocarbons such as n-heptane, cyclohexane, etc., and halogenated hydrocarbons as, for example, chlorobenzene or haloalkanes such as methyl chloride, methylene chloride, chloroform, carbon tetrachloride, ethylene dichloride, etc. Obviously, any mixture of such diluents may be used and in many cases is preferable. For example, when saturated aliphatic hydrocarbons are used as the diluent, it is preferable, particularly if high molecular weight polymers are desired or if very little diluent is present, to use them in admixture with ethers. A complexing agent for the organoaluminum compound, such as ether, tetrahydrofuran, etc., may be used and is particularly desirable in a bulk polymerization process.

The polymerization process may be carried out over a wide range of temperature and pressure. Usually, it will be carried out at a temperature of from about −80° C. to about 250° C., preferably from about −80° C. up to about 150° C., and more preferably within the range of about −30° C. to about 100° C. Usually, the polymerization process will be carried out at autogeneous pressure, but superatmospheric pressures up to several hundred pounds may be used if desired and in the same way, subatmospheric pressures may also be used.

The poly(epihalohydrin) may be prepared as an essentially wholly amorphous polymer, a block copolymer of amorphous and crystalline portions, or as a mixture of amorphous and crystalline polymers. As pointed out above, for some applications, mixtures of amorphous and crystalline polymers may be used. In this case it may not be necessary to separate them and the total polymer produced in the process may be used. In other cases, an essentially wholly amorphous polymer is desired, and, if the polymer product is a mixture of amorphous and crystalline polymer, the amorphous polymer must be separated. This may be done by several means. A convenient method is fractionation based on the difference in solubility of the crystalline and amorphous polymers. Thus, crystalline poly(epichlorohydrin) and poly(epibromohydrin) are insoluble in acetone and benzene at room temperature and the amorphous polymers are completely soluble in acetone and benzene. The amorphous polymer is preferably separated from a mixture of amorphous and crystalline by cold (room temperature) extraction of the mixture with acetone and recovering the amorphous fraction. The amorphous polymer so obtained is usually quite pure. Another method is to dissolve the mixture of polymers in hot acetone (65° C. in the case of poly(epichlorohydrin) and 80° C. for poly(epibromohydrin) in a closed vessel under nitrogen pressure) and then cooling the solution to about −18° C. for at least 16 hours, whereby the crystalline polymer crystallizes out of solution, and again separating and recovering the amorphous polymer from the acetone solution. The latter method gives quite pure crystalline polymer, whereas the amorphous fraction may contain appreciable amounts of crystalline polymers (especially of the block polymer type).

The following examples demonstrate the preparation of the new solid, high molecular weight, amorphous poly(epihalohydrin)s of this invention. All parts and percentages are by weight. The molecular weight of the polymers produced in these examples is shown by the reduced specific viscosity (RSV) given for each. By the term reduced specific viscosity is meant the $\eta sp/C$ determined on a 0.1% solution of the poly(epihalohydrin) in a given diluent at a given temperature. In the case of the poly(epichlorohydrin)s the RSV is determined on a 0.1% solution of the polymer in cyclohexanone containing 0.5% of the antioxidant 2,2'-methylene-bis(4-methyl-6-tert-butyl phenol), which solution is prepared by heating the polymer and cyclohexanone to 125° C. to total solution and then cooling to 50° C. at which temperature the determination is made, or the RSV for the poly(epichlorohydrin)s is determined on a 0.1% solution of the polymer in α-chloronaphthalene dissolved at 100° C. and the viscosity determined at that temperature. The latter method is more accurate. For convenience in comparing the data in the following examples, all of the RSV's obtained on the poly(epichlorohydrin)s in cyclohexanone (CH) have been converted to the value it would be in α-chloronaphthalene (CN) using the following equation to relate them:

$$\log (RSV_{CN}) = 1.170 \log (RSV_{CH}) - 0.133$$

In the case of the other polymers, the diluent and concentration at which the RSV is determined are stipulated.

The intrinsic viscosity and weight average molecular weight of poly(epichlorohydrin)s can be determined from the RSV by means of the following equations:

$$\log \frac{\eta sp}{C} \log [\eta] + 0.15 [\eta] C$$

$$[\eta] = 8.9 \times 10^{-5} M_w^{0.73}$$

where $$\frac{\eta sp}{C} = RSV$$

$[\eta]$ = intrinsic viscosity, $C$ = concentration in grams/100 ml. used for the RSV determination, and $M_w$ = weight average molecular weight. The $M_w$ used in developing these equations was determined by light scattering studies on poly(epichlorohydrin).

EXAMPLE 1

A polymerization vessel, free of air, was charged under nitrogen with the diluent and 10 parts of epichlorohydrin. After equilibrating at 30° C. a solution of the catalyst was injected. The catalyst solution used was prepared by diluting a 1 molar solution of triisobutylaluminum in n-heptane to 0.5 molar with ether, adding an amount of water equal to 0.5 mole per mole of triisobutylaluminum and then agitating the solution at 30° C. for about 16 hours. An amount of this catalyst solution equivalent to 0.79 part of triisobutylaluminum was used. The total amount of diluent was 17.6 parts, of which 84% was ether and the remainder was n-heptane present in the catalyst solution. The polymerization reaction mixture was agitated for 19 hours at 30° C. after which the polymerization was stopped by adding four parts of anhydrous ethanol. The mixture was then diluted with about 40 parts of diethyl ether, and the ether-insoluble polymer which had separated was collected and washed twice with ether. It was then purified by slurrying the insoluble polymer with a 1% solution of hydrogen chloride in ethanol, again collected, washed with methanol until neutral, then with a 0.4% solution of Santonox, i.e. 4,4'-thiobis(6-tert-butyl-m-cresol), in methanol and finally was dried for 16 hours at 50° C. under vacuum. A total conversion of 100% was obtained, 77% of which was ether-insoluble polymer. This ether-insoluble polymer contained 13% crystalline polymer, the remainder being amorphous. The polymer after cold milling had an RSV of 0.75 in α-chloronaphthalene at 100° C.

It was cross-linked by mixing together on a two-roll mill (rolls cooled to about 50° F.) 100 parts of the polymer, 12.5 parts of carbon black, 12.5 parts of neutral silica and 3 parts of hexamethylenediamine carbamate and then heating at 300° F. for 40 minutes. The vulcanizate so obtained had a tensile strength of 1,655 p.s.i., a 100, 200, 300 and 400% modulus of 395, 555, 930 and 1,510 p.s.i., respectively, an ultimate elongation of 420%, break set of 10%, Shore hardness (A) of 63, and tear strength of 121 lb./in. This vulcanizate of poly(epichlorohydrin) was found to be very stable to outdoor exposure, being unchanged after 3 months' exposure. It was also very stable to accelerated aging tests, with no failure in either the Fade-Ometer or Weather-Ometer at 2,500 hours exposure.

EXAMPLE 2

The polymerization process described in Example 1 was repeated, and the ether-insoluble poly(epichlorohydrin) separated, purified, and stabilized (except that a 0.2% solution of the stabilizer was used) as described in that example. This ether-insoluble polymer was then extracted with acetone at room temperature, using 50 ml. of acetone per gram of polymer and shaking the mixture for 16 hours. The acetone-insoluble polymer [crystalline poly(epichlorohydrin)] was separated, washed with fresh acetone, then with acetone containing 0.05% Santonox, and dried. It amounted to a conversion of 21.6% and had an RSV of 3.1 in α-chloronaphthalene at 100° C. The acetone-soluble polymer [amorphous poly(epichlorohydrin)] was separated from the acetone filtrate and first acetone washing by evaporation of the acetone. It amounted to a conversion of 61.4% (69% of the total polymer) and had an RSV of 0.65 in α-chloronaphthalene at 100° C. This amorphous poly(epichlorohydrin) had a density at 23° C., g./ml., of 1.366.

EXAMPLE 3

Ten parts of epibromohydrin was polymerized by the general procedure described in Example 1, using as the catalyst the reaction product of 0.79 part of triisobutylaluminum reacted with 0.04 part of water (molar ratio of 1:0.5). The total amount of the n-heptane–ether diluent was 17.6 parts, of which 88–90% was ether. The polymerization was carried out at 30° C. for 19 hours. The ether-insoluble polymer was isolated as described in Example 1. There was obtained a total conversion of 53%. The conversion to ether-insoluble polymer was 33%. This poly(epibromohydrin) had an RSV of 1.2 as measured on a 0.1% solution in cyclohexanone at 50° C. It was rubbery in character.

This ether-insoluble poly(epibromohydrin) was fractionated by agitating 6.5 parts of it with 200 parts of acetone overnight at room temperature. The acetone-insoluble polymer was separated by filtration, washed with acetone and then suspended in sufficient acetone to make a 1% suspension, and heated to 80–82° C. in a closed vessel under nitrogen whereby it was dissolved in 4 hours. It was then cooled to 30° C. and allowed to crystallize overnight. The recrystallized acetone-insoluble polymer was again washed with acetone, then with methanol containing 0.2% Santonox and finally was dried for 16 hours at 80° C. There was obtained 1.3 parts of a white, film-like, somewhat rubbery solid. It had an RSV of 1.8 in cyclohexanone at 50° C. and was shown to be moderately crystalline by X-ray. Analysis for bromine showed agreement with the theoretical value. The acetone-soluble polymer was recovered by combining the acetone extracts and washes, removing the acetone and then treating the residue with 80 parts of methanol containing 0.2% Santonox after which the polymer was dried for 16 hours at 80° C. under vacuum. There was recovered 2.8 parts of the acetone-soluble, methanol-insoluble polymer which was a tough, rubbery material having an RSV of 0.8 in cyclohexanone at 50° C. and shown to be amorphous by X-ray. Its bromine analysis agreed with the theoretical.

This amorphous poly(epibromohydrin) was cross-linked by milling 100 parts of the polymer with 4 parts of hexamethylenediamine carbamate and then heating for 40 minutes at 300° C. The vulcanizate was quantitatively insoluble in cyclohexanone after 4 hours at 60° C. and had the properties typical of a cross-linked elastomer.

EXAMPLE 4

A copolymer of epichlorohydrin and epibromohydrin was prepared following the general polymerization procedure described in Example 1. In this case the total diluent was 44 parts of ether and the monomer charge was 18 parts of epichlorohydrin and 2 parts of epibromohydrin. The catalyst used was 1.58 parts of triisobutylaluminum which had been reacted with 0.5 mole of water and was added in four equal portions at 0.5 hour apart. The polymerization reaction was carried out for 5.5 hours at 30° C. The ether-insoluble polymer that was separated amounted to a conversion of 74%. This copolymer had an RSV of 2.1 as measured in α-chloronaphthalene at 100° C. It contained 91% of epichlorohydrin by weight and 9% of epibromohydrin by weight and was a tough rubber which was amorphous by X-ray.

This rubbery copolymer of epichlorohydrin and epibromohydrin was vulcanized by compounding on a two-roll mill (roll temperature of 175° F.) for 5–7 minutes 100 parts of the polymer with 30 parts of fast extruded furnace black, and 4 parts of triethylenediamine. The vulcanizate so obtained had a tensile strength of 970 p.s.i., an ultimate elongation of 85%, a 100% gel formation and 95% swell in toluene.

EXAMPLES 5–8

In each of these examples 10 parts of epichlorohydrin was polymerized following the general procedure described in the foregoing examples. The catalyst used in each case was 0.4 part of triisobutylaluminum chelated with varying chelating agents in varying amounts per mole of aluminum, each of these chelated catalysts being aged for one hour at 30° C. before using. In Table I below is set forth the diluent used in each example, the chelated catalyst, the reaction time and temperature, the total percent conversion, and the amount of the ether-insoluble, methanol-insoluble polymer which was amorphous and rubberlike, indicated as percent of the total polymer, the RSV (α-chloronaphthalene at 100° C.) of this polymer and the description thereof.

Table I

| Example | Diluent | Catalyst | Reaction Time, Hrs. | Reaction Temp., °C | Total Percent Conv. | RSV | Percent of Total Polymer | Description |
|---|---|---|---|---|---|---|---|---|
| 5 | n-Heptane | $(i\text{-}C_4H_9)_3Al + 0.1$ (3-diethylamino-1-propanol) | 19 | 30 | 78 | 0.66 | 99 | Snappy, tacky rubber. |
| 6 | ---do--- | $(i\text{-}C_4H_9)_3Al + 0.2$ (3-diethylamino-1-propanol) | 19 | 30 | 83 | 0.79 | 99 | Do. |
| 7 | ---do--- | $(i\text{-}C_4H_9)_3Al + 0.4$ (3-diethylamino-1-propanol) | 19 | 30 | 86 | 0.9 | 100 | Do. |
| 8 | ---do--- | $(i\text{-}C_4H_9)_3Al + 0.4$ m-diethylaminophenol | 19 | 30 | 81 | 0.49 | 100 | Tacky rubber. |

EXAMPLE 9

Epifluorohydrin (10 parts) was polymerized following the general procedure of the foregoing examples using 37 parts of dry toluene as the diluent. The catalyst used was triethylaluminum which had been chelated with 0.5 mole of acetylacetone per mole of aluminum in a 70:30 ether:n-heptane diluent at 0.5 M concentration of triethylaluminum and then reacted with 0.5 mole of water per mole of aluminum. A portion of the catalyst equivalent to 0.46 part of triethylaluminum was added initially, and an equal amount after 3.5, 5.0, 6.0 and 19 hours at 30° C. After 27 hours at 30° C., the reaction mixture was placed in a 50° C. bath for 120 hours. The poly(epifluorohydrin) was isolated by the procedure described in Example 1 to give a polymer which was soluble in hot and cold acetone and insoluble in ether, methanol or ethanol. It was a rubbery, cheesy polymer and had an RSV of 0.20 in α-chloronaphthalene at 100° C. A carbon, hydrogen and fluorine analysis was in agreement with the theoretical values for poly(epifluorohydrin).

EXAMPLE 10

A mixture of 9.8 parts of epichlorohydrin and 0.2 part of epifluorohydrin was copolymerized by mixing with 24 parts of diethyl ether and then adding a

$(i\text{-}C_4H_9)_3Al \cdot 0.5H_2O$ catalyst, prepared as described in Example 1. An amount of this catalyst equivalent to 0.79 part of triisobutylaluminum was added initially and again at 17, 18 and 21 hours at 30° C. After a total of 88 hours at 30° C. the polymer was isolated by the procedure described in Example 1 for the isolation of poly(epichlorohydrin). The copolymer isolated was rubbery, amorphous, had an RSV of 0.3 in α-chloronaphthalene at 100° C. and a fluorine analysis equivalent to 2% epifluorohydrin. It was compounded with 5 parts of hexamethylenediamine carbamate per 100 parts of polymer and then press cured for 40 minutes at 310° F. The vulcanizate so obtained was quantitatively insoluble in toluene (4 hours at 80° C.), being swollen 265%.

EXAMPLE 11

Epibromohydrin, 20 parts, was polymerized in 41 parts of n-heptane following the general procedure of the previous examples using as the catalyst triethylaluminum (0.9 part) chelated with 0.5 mole of acetylacetone per mole of aluminum and then reacted with 0.5 mole of water per mole of aluminum. The polymerization was run for 19 hours at 65° C. The ether-insoluble, methanol-insoluble polymer was isolated as described in Example 1 and amounted to a conversion of 58% and yield of 84%. It was fractionated into a crystalline and an amorphous fraction by extraction with cold acetone. The cold acetone-soluble fraction amounted to about 24% of the total and was amorphous. It had an RSV of 0.25 in α-chloronaphthalene at 100° C. and was a fairly tough rubber. This polymer (100 parts) was compounded with 30 parts of fast extruding furnace black, 2 parts of sulfur, 1.5 parts of mercaptobenzothiazole, 5 parts of magnesium oxide, and 5 parts of tributylamine. The compounded mixture was press cured for 40 minutes at 310° F. The vulcanizate so obtained had a tensile strength of 1,360 p.s.i., a 100% modulus of 865 p.s.i., an elongation of 180% and a hardness (A2) of 74.

EXAMPLE 12

Epichlorohydrin (15 parts) in 35 parts of a diluent comprising 94% ether and the remainder n-heptane was polymerized by the procedure described in Example 1 using as the catalyst triethylaluminum which had been prereacted with 0.6 mole of water per mole of aluminum. The catalyst used amounted to 0.46 part of triethylaluminum and was added in 4 portions 30 minutes apart. After 21 hours at 30° C. the ether-insoluble, methanol-insoluble polymer was isolated as described in Example 1. This ether-insoluble, methanol-insoluble polymer was then extracted with cold acetone, and the cold acetone-soluble polymer was isolated from this acetone solution by precipitating with methanol containing 0.4% of Santonox. The poly(epichlorohydrin) so obtained had an RSV of 2.8 in α-chloronaphthalene at 100° C. This corresponds to a weight average molecular weight of 1.1 million. It was almost completely amorphous as shown by the fact that on recrystallization from a 1% acetone solution at −18° C. it was possible to isolate a crystalline fraction amounting to only about 5%. Infrared spectrum determined on a compression molded film (molded at >125° C., then cooled to room temperature) was essentially that found to be characteristic of amorphous poly(epichlorohydrin).

One hundred parts of this poly(epichlorohydrin) was compounded with 50 parts of fast extruding furnace black and 2 parts of hexamethylenediamine carbamate. By compounding on a two-roll mill with both rolls at 65° F. for 45 minutes it was then subjected to curing for 5 minutes at 300° F. It had a tensile strength of 2,150 p.s.i. and an ultimate elongation of 300%. This vulcanizate was tested for its solvent resistance by placing a strip 2 x ¼ inches of the cured stock in a tube filled with the solvent, which tube was placed in an oven at 52° C. for 24 hours. The samples were then cooled to room temperature and measured to determine the percent swell with the following results:

|  | Percent |
|---|---|
| 100% isooctane | 0.0 |
| 70% isooctane, 30% toluene | 5.0 |
| Gasoline | 3.5 |
| Perchloroethylene | 10.0 |
| Trichloroethylene | 30.0 |
| $CCl_4$ | 16.0 |
| Butyl alcohol | 1.0 |
| Toluene | 30.0 |
| Xylene | 27.0 |
| Water | 2.0 |
| Aqueous HCl (conc.) 15.0% by weight | 4.0 |
| Aqueous NaOH | 2.5 |

Another portion of the amorphous poly(epichlorohydrin) of this example was milled to an RSV of 1.5 and then 100 parts was compounded with 30 parts of fast extruding furnace black, 10 parts of dicyclohexylethylamine, 2.5 parts of tetramethyl thiuram disulfide, 5 parts of sulfur and 5 parts of zinc oxide. The compounded polymer was then cured for 40 minutes at 310° F. The vulcanizate so obtained had a tensile strength of 2,400 p.s.i., a modulus (200%) of 1,060 p.s.i., and an elongation of 420%.

EXAMPLES 13–16

These examples demonstrate the properties of vulcanizates prepared from epichlorohydrin polymers of varying RSV's.

The poly(epichlorohydrin)s were in each case prepared by the procedure as described in Example 1, except that in the case of Example 16 the polymerization was carried out at 65° C. instead of 30° C., and the diluent was 14% ether with the remainder n-heptane. The polymer used in Examples 13 and 14 were obtained by subjecting a cold-acetone-soluble poly(epichlorohydrin) prepared by the procedure described in Example 11 and having an RSV of 1.8 in α-chloronaphthalene at 100° C., to shear degradation for 25 minutes and 15 minutes, respectively.

One hundred parts of each of these poly(epichlorohydrin)s was compounded with 12.5 parts of fast extruding furnace black, 12.5 parts of neutral silica and 3 parts of hexamethylenediamine carbamate. The vulcanization was carried out in each case for 40 minutes at 300° F. The physical properties of the vulcanizate so obtained are tabulated below.

Table II

| Example | 13 | 14 | 15 | 16 |
| --- | --- | --- | --- | --- |
| RSV: | | | | |
| CN | 0.17 | 0.22 | 0.27 | 0.75 |
| CH | 0.29 | 0.36 | 0.42 | 0.9 |
| Tensile Strength p.s.i. | (¹) | 365 | 450 | 1,655 |
| 100% Modulus p.s.i. | | 200 | 155 | 395 |
| 200% Modulus p.s.i. | | 345 | 250 | 555 |
| Ultimate Elongation, percent | | 200 | 245 | 420 |
| Shore Hardness A2 | | 40 | 31 | 63 |

¹ Gum was tacky (wholly intractable) and was not amenable to vulcanization on conventional rubber handling equipment.

This application is a continuation-in-part of my applications Serial No. 738,626, filed May 29, 1958, and now abandoned, and of Serial No. 812,079 filed May 11, 1959, now Patent No. 3,135,705, and of my application Serial No. 812,080, filed May 11, 1959, now Patent No. 3,135,706, which is a continuation-in-part of my application Serial No. 738,632, filed May 29, 1958, and now abandoned.

What I claim and desire to protect by Letters Patent is:

1. As a new composition of matter, a solid, rubbery poly(epihalohydrin) characterized by being essentially wholly amorphous as determined by X-ray analysis, soluble in acetone at room temperature, and having a reduced specific viscosity of at least about 0.2 as measured on a 0.1% solution of the polymer in α-chloronaphthalene at 100° C.

2. The product of claim 1 wherien the poly(epihalohydrin) is poly(epichlorohydrin).

3. The product of claim 1 wherein the poly(epihalohydrin) is poly(epibromohydrin).

4. The product of claim 1 wherein the poly(epihalohydrin) is poly(epifluorohydrin).

5. The product of claim 1 wherein the poly(epihalohydrin) is a copolymer of epichlorohydrin and epibromohydrin.

6. The product of claim 1 wherien the poly(epihalohydrin) is a copolymer of epichlorohydrin and epifluorohydrin.

7. The product of claim 1 wherein the poly(epihalohydrin) has a reduced specific viscosity of at least about 0.5.

8. The product of claim 2 wherein the poly(epihalohydrin) has a reduced specific viscosity of at least about 0.5.

9. The product of claim 3 wherein the poly(epihalohydrin) has a reduced specific viscosity of at least about 0.5.

10. The product of claim 4 wherien the poly(epihalohydrin) has a reduced specific viscosity of at least about 0.5.

11. The product of claim 5 wherein the poly(epihalohydrin) has a reduced specific viscosity of at least about 0.5.

12. The product of claim 6 wherein the poly(epihalohydrin) has a reduced specific viscosity of at least about 0.5.

References Cited in the file of this patent

UNITED STATES PATENTS

| 2,706,182 | Pruitt et al. | Apr. 12, 1955 |
| 2,844,545 | Borkovec | July 22, 1958 |
| 2,871,219 | Baggett et al. | Jan. 27, 1959 |

FOREIGN PATENTS

| 477,843 | Great Britain | Jan. 3, 1938 |

OTHER REFERENCES

Bennet: "Concise Chemical and Technical Dictionary"; published by Chemical Publishing Co., 1947 (page 797 relied on).

Webster's New International Dictionary, 2nd ed., published by G. and C. Merriam Co., 1953 (pp. 88 and 2120 relied on).

Mark and Tobolsky: "Physical Chemistry of High Polymeric Systems" published by Interscience Publishers (New York), 1950 (pages 357, 358, and 359 relied on).

UNITED STATES PATENT OFFICE
CERTIFICATE OF CORRECTION

Patent No. 3,158,580            November 24, 1964

Edwin J. Vandenberg

It is hereby certified that error appears in the above numbered patent requiring correction and that the said Letters Patent should read as corrected below.

Column 3, line 40, for "hydrate" read -- hydride --; column 6, lines 57 and 58, in the equation, before "log", second occurrence, insert an equal sign.

Signed and sealed this 6th day of April 1965.

(SEAL)
Attest:

ERNEST W. SWIDER            EDWARD J. BRENNER
Attesting Officer            Commissioner of Patents